United States Patent
Morimoto

[11] Patent Number: 6,115,564
[45] Date of Patent: Sep. 5, 2000

[54] IMAGE FORMING APPARATUS WITH OPTICAL-SYSTEM INCORPORATING UNIT

[75] Inventor: Yasumasa Morimoto, Kashihara, Japan

[73] Assignee: Sharp Kabushiki Kaisha, Osaka, Japan

[21] Appl. No.: 09/210,096

[22] Filed: Dec. 11, 1998

[30] Foreign Application Priority Data

Dec. 22, 1997 [JP] Japan ...................................... 9-352716

[51] Int. Cl.⁷ .......................... G03G 21/00; G03G 21/20; H04N 1/04
[52] U.S. Cl. ............................. 399/92; 358/483; 358/498; 399/118
[58] Field of Search ...................... 399/118, 92; 358/482, 358/483, 498

[56] References Cited

U.S. PATENT DOCUMENTS

| | | | |
|---|---|---|---|
| 5,559,609 | 9/1996 | Yamada et al. ...................... | 358/498 X |
| 5,884,117 | 3/1999 | Tanoue et al. ....................... | 358/498 X |

FOREIGN PATENT DOCUMENTS 2684363  9/1988  Japan .

*Primary Examiner*—Fred L Braun
*Attorney, Agent, or Firm*—Renner, Otto, Boisselle & Sklar

[57] ABSTRACT

An image forming apparatus includes: a cabinet cover unit having a control panel; an optical system-incorporating unit incorporating a scanner portion for optically reading the information of originals and having a separation roller for feeding originals to a cover glass of the scanner. This optical system-incorporating unit is provided in an openable and closable manner so that the interior of the apparatus body can be exposed when it is opened with respect to the apparatus body. The cabinet cover unit can be opened and closed with respect to the optical system-incorporating unit so that the optical system-incorporating unit will be exposed when it is opened. The original conveyance path for conveying an original for permitting the scanner portion to reading the original is provided between the cabinet cover unit and optical system-incorporating unit while the recording paper conveyance path for conveying recording paper after printing by the recording portion is provided between the optical system-incorporating unit and the apparatus body.

5 Claims, 9 Drawing Sheets

IMAGE FORMING APPARATUS WITH OPTICAL-SYSTEM INCORPORATING UNIT

BACKGROUND OF THE INVENTION (1) Field of the Invention

The present invention relates to an image forming apparatus with multiple functions integrated within, such as printer, copier, scanner and other functions.

(2) Description of the Prior Art

Recently, there is an image forming apparatus which integratedly has printer, scanner and other functions and can be used in connection with computers, the telephone line and the like. These individual components are combined so as to constitute an integrated image forming apparatus having multi-functions, as printer, copier, scanner and other functions.

In general, in an image forming apparatus having multiple functions as stated above, function selection keys are laid out on the control portion and are used to select a function, either copier or printer, whereby one mode corresponding to the selected function is set up.

The structure of the body of such an image forming apparatus having multi-functions is liable to be bulky.

On the other hand, there have been demands for miniaturization of the apparatuses of this type. Therefore, each component needs to be down-sized, and the optical system including first and second mirrors, a focusing lens and an image reading element (CCD element) also needs be made compact.

As a prior art example of this technology, an image reading apparatus having an optical system including first and second mirrors, a focusing lens and an image reading element (CCD element) is disclosed in patent publication of Japanese Patent No. 2,684,363.

In this apparatus, an original set on an original table in the upper part of the image reading apparatus is conveyed facedown by means of original conveying rollers which are provided on both upstream and downstream sides of the original table, and is illuminated at the image reading position with light by an illuminating lamp. The image of light from the illuminated original is reflected by the first mirror to reach the second mirror. Then the light reflected by the second mirror is focused on the CCD element via the focusing lens.

In this apparatus, the second mirror, the lens and the CCD element are laid out on the same plane which is approximately in parallel with the surface of the original so as to make the structure compact.

The above case of the prior art, however, has suffered from a problem in that paper dust, arising from the original documents when they are conveyed in contact with the original conveying rollers, enters the machine interior through small structural gaps around the original conveying rollers, to thereby stain the surfaces of the first and second mirrors and focusing lens in the optical system, causing failure to exactly read the original image. Further, since the optical system was fixed to the machine main body, it was difficult to clean the optical system.

As another prior art example, there is an image forming apparatus which has been manufactured by the company of the present applicant. This apparatus has an optical system including first, second and third mirrors, a focusing lens, an image reading element (CCD), in which the reflected light from the original is reflected multiple times between the second and third mirrors so as to obtain a required optical path length.

In the case of this prior art, since the second and third mirrors need to be large, this makes the apparatus body bulky.

Further, since multiple reflections markedly attenuate the strength of the reflected light from the original, the light intensity of the light source needs to be high to compensate for this attenuation. However, the increase in light intensity induces another risk that the original image reading position might be heated excessively, possibly burning the original document that is conveyed.

SUMMARY OF THE INVENTION

The present invention has been devised in view of the above problems and therefore it is an object of the invention to provide an image forming apparatus in which the optical system including first and second mirrors and a focusing lens can be provided as a unit so as to be replaceable, and be openable and closable with respect to the apparatus body to enable easy and reliable cleaning of it and in which the optical system can be made compact thus down-sizing the image forming apparatus body.

In order to achieve the above object, the present invention is configured as follows:

In accordance with the first aspect of the invention, an image forming apparatus at least having an optical system for reading the information of originals and a recording portion for recording the information onto a sheet of recording paper, comprises:

a cabinet cover portion having a control panel portion with a display, control keys, etc.; and an optical system-incorporating unit which incorporates an optical system for optically reading the information of originals and has an original conveying roller for conveying originals to the original reading portion of the optical system, and is characterized in that the optical system-incorporating unit can be opened and closed with respect to the apparatus body so that the interior of the apparatus body will be exposed when it is opened while the cabinet cover portion can be opened and closed with respect to the optical system-incorporating unit so that the optical system-incorporating unit will be exposed when it is opened; and an original conveyance path is arranged between the cabinet cover portion and the optical system-incorporating unit for conveying original therethrough to enable the optical system to read the originals; and a recording paper conveyance path is arranged between the optical system-incorporating unit and the apparatus body for conveying recording sheets after printing by the recording portion.

In accordance with the second aspect of the invention, the image forming apparatus having the above first feature is characterized in that the optical system-incorporating unit has an original conveyance surface on the side thereof opposing the cabinet cover portion and a recording paper conveyance surface on the side thereof opposing the interior of the apparatus body, and the recording paper conveyance path is opened by opening the optical system-incorporating unit while the original conveyance path is opened by opening the cabinet cover portion.

In accordance with the third aspect of the invention, the image forming apparatus having the above second feature is characterized in that a guide member for guiding recording paper toward the optical system-incorporating unit and for covering the recording portion is integrally formed on the side of the recording paper conveyance path surface of the optical system-incorporating unit.

In accordance with the fourth aspect of the invention, the image forming apparatus having the above first feature is characterized in that the optical system-incorporating unit incorporates a driving means for driving the original conveying roller.

In accordance with the fifth aspect of the invention, the image forming apparatus having the above first feature is characterized in that an air suctioning fan for drawing air into the apparatus body is laid out on one side in the interior of the apparatus body and the heat-emitting element is laid out on the opposite side in the interior thereof with circuit boards located therebetween; and a slanted member having a predetermined width is arranged in the position opposing the air suctioning fan in the interior of the apparatus body so that the air drawn in from the outside by the air suctioning fan can uniformly flow by the function of the slanted member, whereby the drawn air passes by the circuit boards, thereafter is exhausted together with heat from the heat-emitting element, to the machine exterior.

In accordance with the sixth aspect of the invention, an image forming apparatus including an original reading means for reading the original image and a recording means for recording the image information onto a sheet of recording paper being conveyed, based on the image signal obtained from the original image, is characterized in that the image reading means provided as an optical system-incorporating unit has an original stacking surface on which originals are stacked and an original conveying means for conveying originals from the stack into the original conveyance path having an original reading position as a part thereof and incorporates: a light source disposed below the original reading position for illuminating the original as it is conveyed by the original conveying means; reflecting means composed of first and second mirrors deflecting the reflected light from the original in predetermined directions so as to create a long optical path along the original conveyance path; a focusing lens focusing the light reflected by the second mirror; and a light-receiving element for receiving light having passed through the focusing lens.

In accordance with the seventh aspect of the invention, the image forming apparatus having the above sixth feature is characterized in that the image forming means is disposed on one side of the optical system-incorporating unit while a cabinet cover portion having a control panel portion with a display and control keys and the like, is disposed on the opposite side thereof.

In accordance with the eighth aspect of the invention, the image forming apparatus having the above sixth feature is characterized in that the original conveyance path is formed on the side of the optical system-incorporating unit opposing the cabinet cover portion and the recording paper conveyance path for conveying recording paper after recording is formed on the side of the optical system-incorporating unit opposing the image forming means, and the recording paper conveyance path is freed by opening the optical system-incorporating unit while the original conveyance path is freed by opening the cabinet cover portion.

In accordance with the ninth aspect of the invention, the image forming apparatus having the above sixth feature is characterized in that the optical system-incorporating unit has a driving means for driving the original conveying means.

DESCRIPTION OF THE PREFERRED EMBODIMENTS

An image forming apparatus of the present invention will hereinafter be described with reference to the accompanying drawings.

Figure 1:
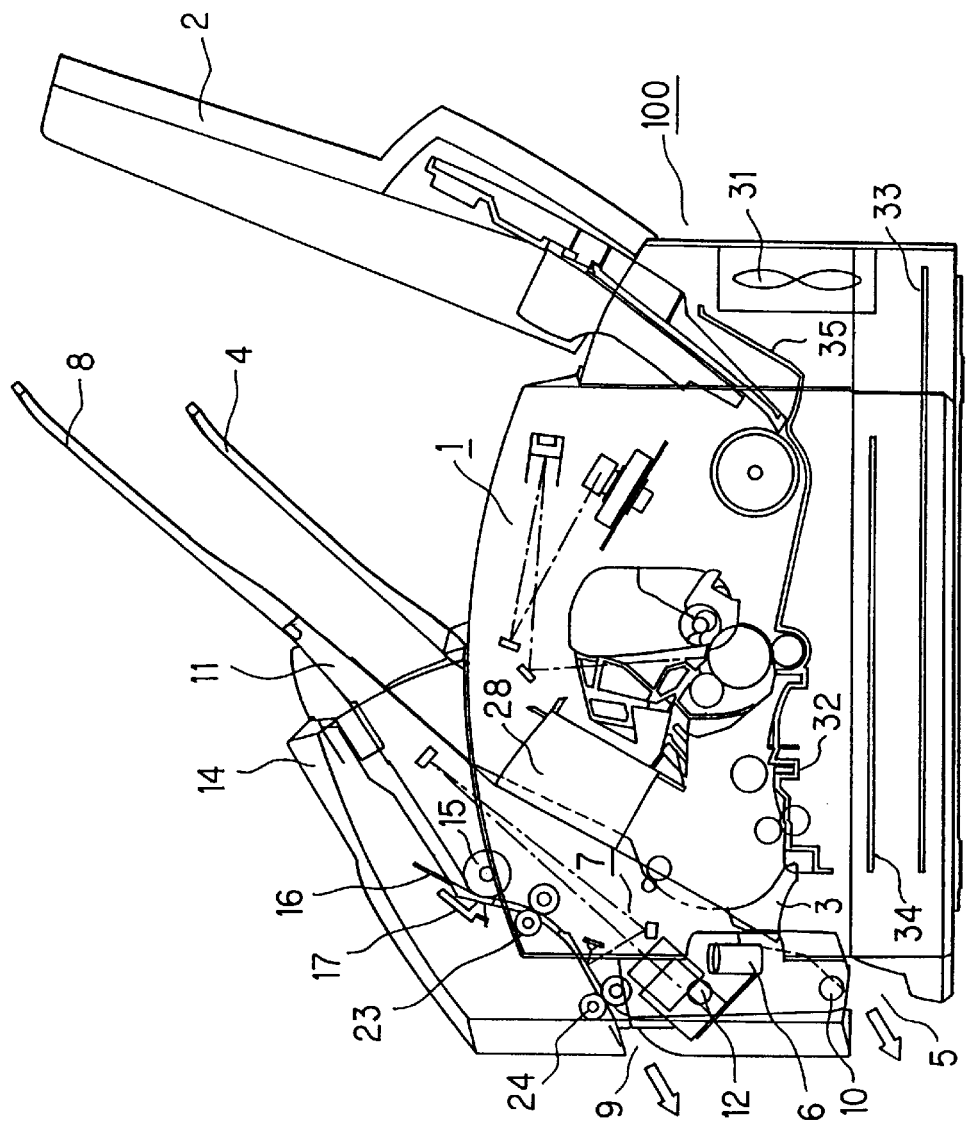
FIG. 1 is a sectional view showing an image forming apparatus of the present invention.

FIG. 1 shows a configuration of an image forming apparatus 100 having an image reader as the first embodiment.

A recording portion 1 is provided in the central portion of the apparatus body. In response to a printing command, a recording sheet is fed from a recording sheet tray 2 and passes through the printer engine, and then the sheet after printing is discharged to a recording sheet output tray 4 in the upper part of the apparatus body or to a recording sheet output port 5 in the lower part thereof, by the selected state of a selection lever 3 for sheet discharge direction.

As this selection lever 3 is moved by a selection knob 6 provided on the apparatus body, one of the conveyance paths, either to recording sheet output tray 4 or recording sheet output port 5, is selected for the printed sheet output from recording portion 1.

A scanner portion 7 as an optical system for reading originals is provided in the upper, front portion of the apparatus body. With originals to be scanned set on an original tray 8, in response to the command from a computer, each original is fed to pass through the scanner engine whilst the data is picked up by the computer, and then is discharged to an original discharge port 9.

In the copy mode, while the original is read by scanner portion 7, the data is printed onto a recording sheet through recording portion 1.

Scanner portion 7 is incorporated in an optical system-incorporating unit 11 which is provided so as to be openable and closable with respect to the apparatus body on an opening and closing shaft 10. A cabinet cover unit 14 having a control panel (13 in FIG. 2) having a display portion and control keys etc., is provided in an openable and closable manner on an opening and closing shaft 12 with respect to optical system-incorporating unit 11.

This cabinet cover unit 14 and optical systemincorporating unit 11 define an original conveyance path for feeding originals to be read by scanner portion 7 (between the interior side of cabinet cover unit 14 opposing optical system-incorporating unit 11 and the side of optical system-incorporating unit 11 opposing cabinet cover unit 14). Formed between optical system-incorporating unit 11 (the side opposing the apparatus body) and the apparatus body is a recording paper conveyance path for discharging the recording sheet after printing, output from recording portion 1 to recording sheet output tray 4.

The originals to be scanned, stacked on original tray 8 are separated, one by one, by the function of a separation roller 15 and a rubber plate 16. Upon this separation, a pressing member 17 pivots so as to press rubber plate 16 against separation roller 15, so that rubber plate 16 will conform the original to separation roller 15, thus facilitating the original to be separated. The original to be scanned is fed facedown so that it is illuminated at image reading position (image reading portion) with light from an illuminating lamp 18 of scanner portion 7. The image of light from the original thus illuminated is reflected by a first mirror 19, reaching a second mirror 20, whereby the light is reflected so as to be focused on a CCD element 22 via a focusing lens 21.

Separation roller 15 is rotated at a relatively low rate so that the originals to be scanned will be separated, sheet by sheet. On the other hand, a pair of feed rollers 23 provided on the upstream side of the image reading position of scanner portion 7 and a pair of discharge rollers 24 provided on the downstream side of the image reading position are driven at a higher rate than separation roller 15 so as to provide a clearance between the originals to be fed to the image reading position.

Separation roller 15 is formed with a one-way clutch, so that when the leading end of the original to be scanned has passed by separation roller 15 and reaches feed rollers 23, the original to be scanned will not be broken or torn due to the difference in feed rate. That is, the separation roller is configured so as to idly rotate when the original is drawn by feed rollers 23, to thereby prevent the original from being tensioned unnecessarily and hence preventing the breakage of the original.

When an original (being scanned) is conveyed by feed rollers 23 and the trailing end thereof has passed by separation roller 15, the force which has acted on separation roller 15 via the original will no longer act on separation roller 15, so that it rotates at a lower rotational rate than the designated rotational rate of feed rollers 23.

Accordingly, when a next original is fed from original tray 8 by separation roller 15, this original is conveyed at a rate lower than that of the preceding original which is conveyed by feed roller 23 whilst being scanned. Therefore, a clearance arises between the rear end of the original being scanned and the leading end of the next original, and this clearance makes it possible to detect the rear end of the original which is being scanned. Thus, based on this detection result, it is possible to judge whether reading of one original has been completed.

Figure 2:
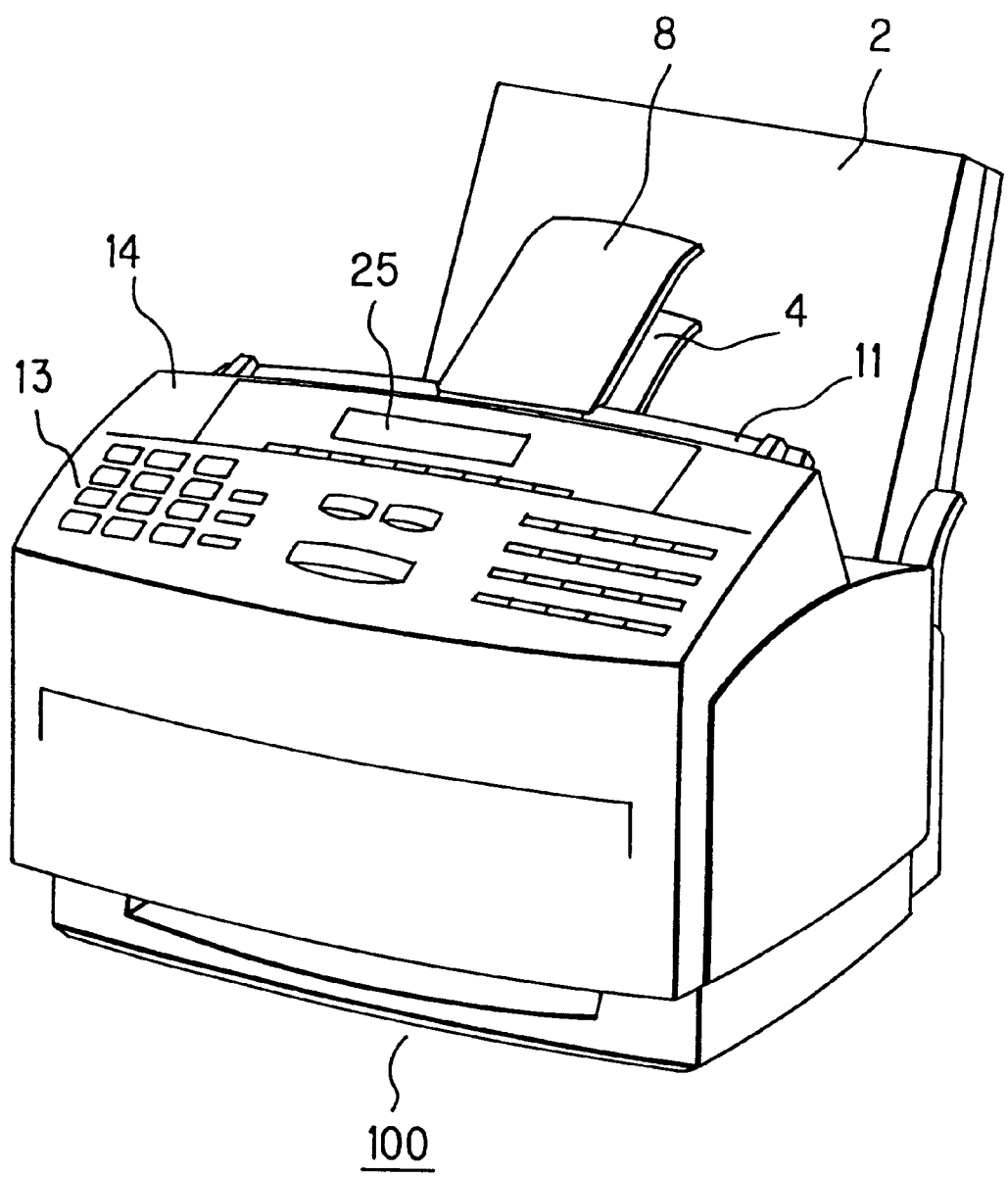
FIG. 2 is a perspective view showing the image forming apparatus body shown in FIG. 1, viewed from a point above.

FIG. 2 is a perspective view showing the apparatus shown in FIG. 1, viewed from a point above. A control panel portion 13 having a display portion, control keys, etc., is disposed on the front side of the apparatus body. Control panel portion 13 has keys for designating the number of copiers, copy density, etc., and a display portion 25 of a liquid crystal type.

In this way, the cabinet cover portion and the optical system-incorporating unit are arranged in layers, to thereby attain a compact design, realizing a desk top configuration as in the conventional one.

Figure 3:
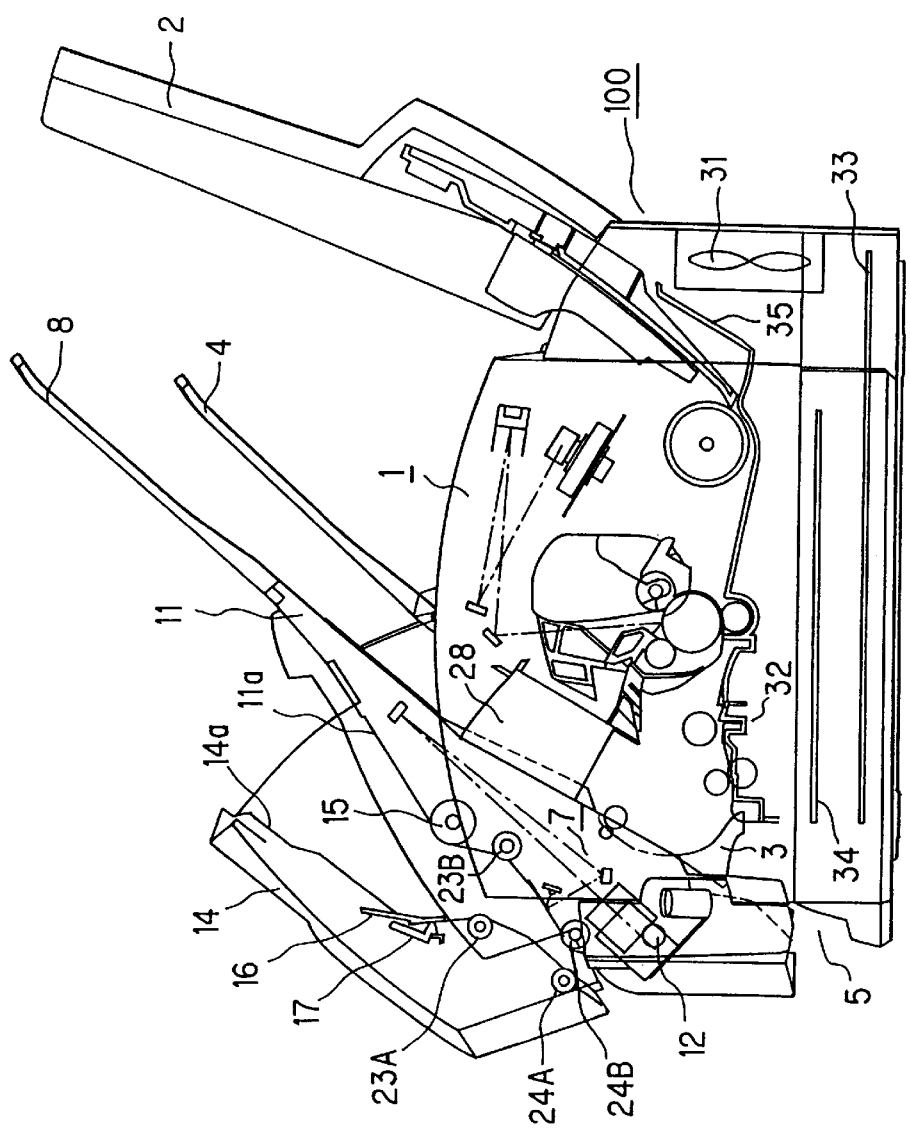
FIG. 3 is a sectional view showing a state where the cabinet cover portion is open about its opening and closing shaft with respect to the apparatus body shown in FIG. 1.

FIG. 3 is a sectional view showing a state where cabinet cover unit 14 is open about opening and closing shaft 12. Formed on the side of cabinet cover unit 14 opposing optical system-incorporating unit 11 is an original conveyance surface 14*a* that defines the original conveyance path for conveying originals from original tray 8 to original discharge port 9. Arranged on this original conveyance surface 14*a* are the aforementioned rubber plate 16, pressing member 17, one of the feed rollers (driven side roller) 23A, and one of the discharge rollers (driven side roller) 24A.

Formed on the side of optical system-incorporating unit 11 opposing cabinet cover unit 14 is an original conveyance surface 11*a* that defines the original conveyance path for conveying originals from original tray 8 to original discharge port 9. Arranged on this original conveyance surface are separation roller 15, the opposing feed roller (drive side roller) 23B and the opposing discharge roller (drive side roller) 24B.

If jamming of an original to be scanned has arisen in the original conveyance path, the operator only needs to open cabinet conveyer unit 14 about opening and closing shaft 12, as illustrated, so that original conveyance surface 14*a* of cabinet cover unit 14 opens upwards, thus freeing (exposing) the original conveyance path, to allow the operator to remove the jammed original.

Figure 4:
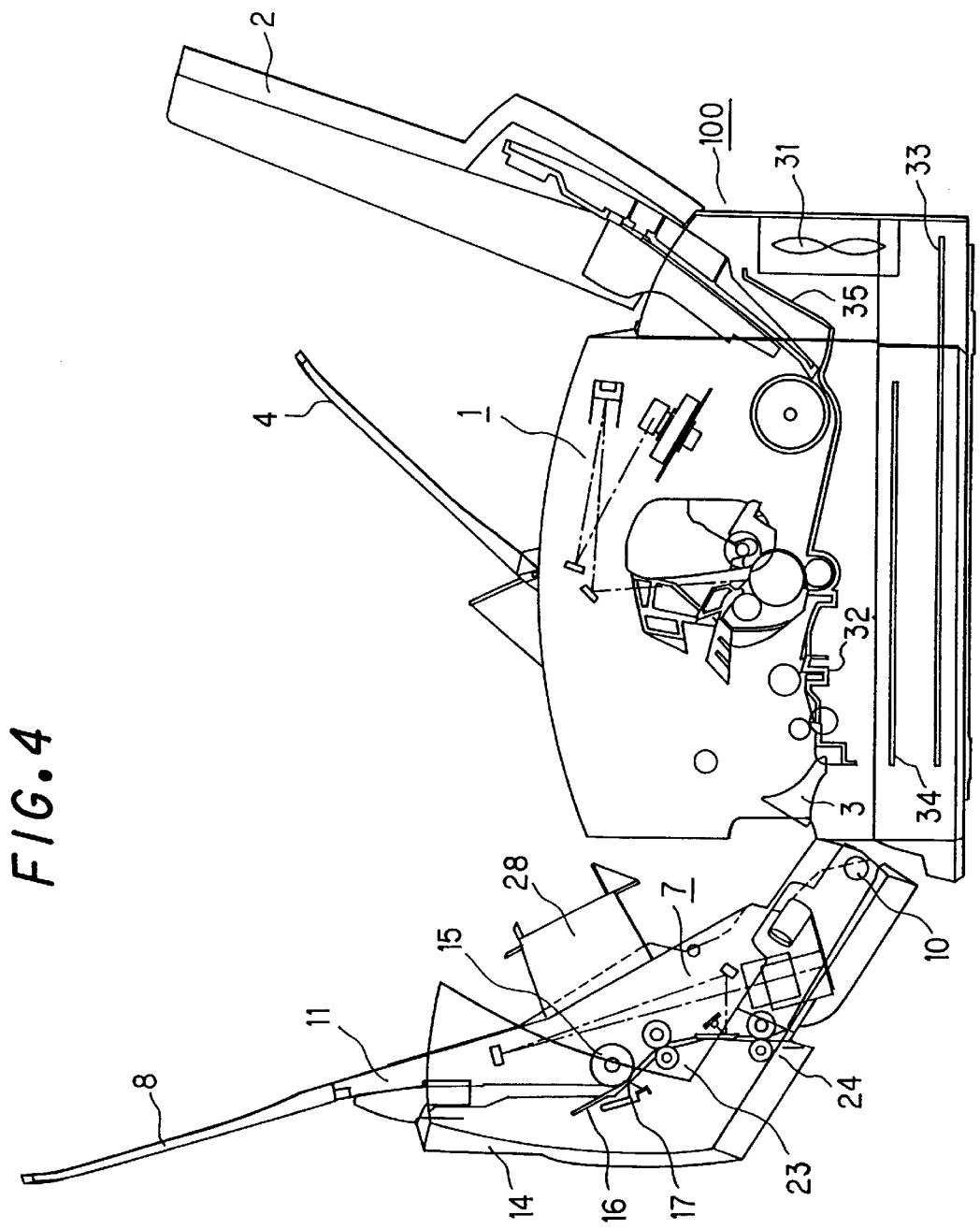
FIG. 4 is a sectional view showing a state where the cabinet cover portion and the optical system-incorporating unit are open together about their respective opening and closing shafts with respect to the apparatus body shown in FIG. 1.

FIG. 4 is a sectional view showing a state where cabinet cover unit 14 and optical system-incorporating unit 11 are opened together about the opening and closing shaft 10. Formed on the side of optical system-incorporating unit 11 opposing the apparatus body is a recording paper conveyance surface 11*b* that defines the recording paper conveyance path.

If jamming of a recording sheet with a copy image thereon has arisen, the operator needs to open optical system-incorporating unit 11 about opening and closing shaft 10, as illustrated, so that recording paper conveyance surface 11*b* of optical system-incorporating unit 11 opens upwards, thus freeing (exposing) the recording paper conveyance path, to allow the operator to remove the jammed recording sheet.

Figure 5:
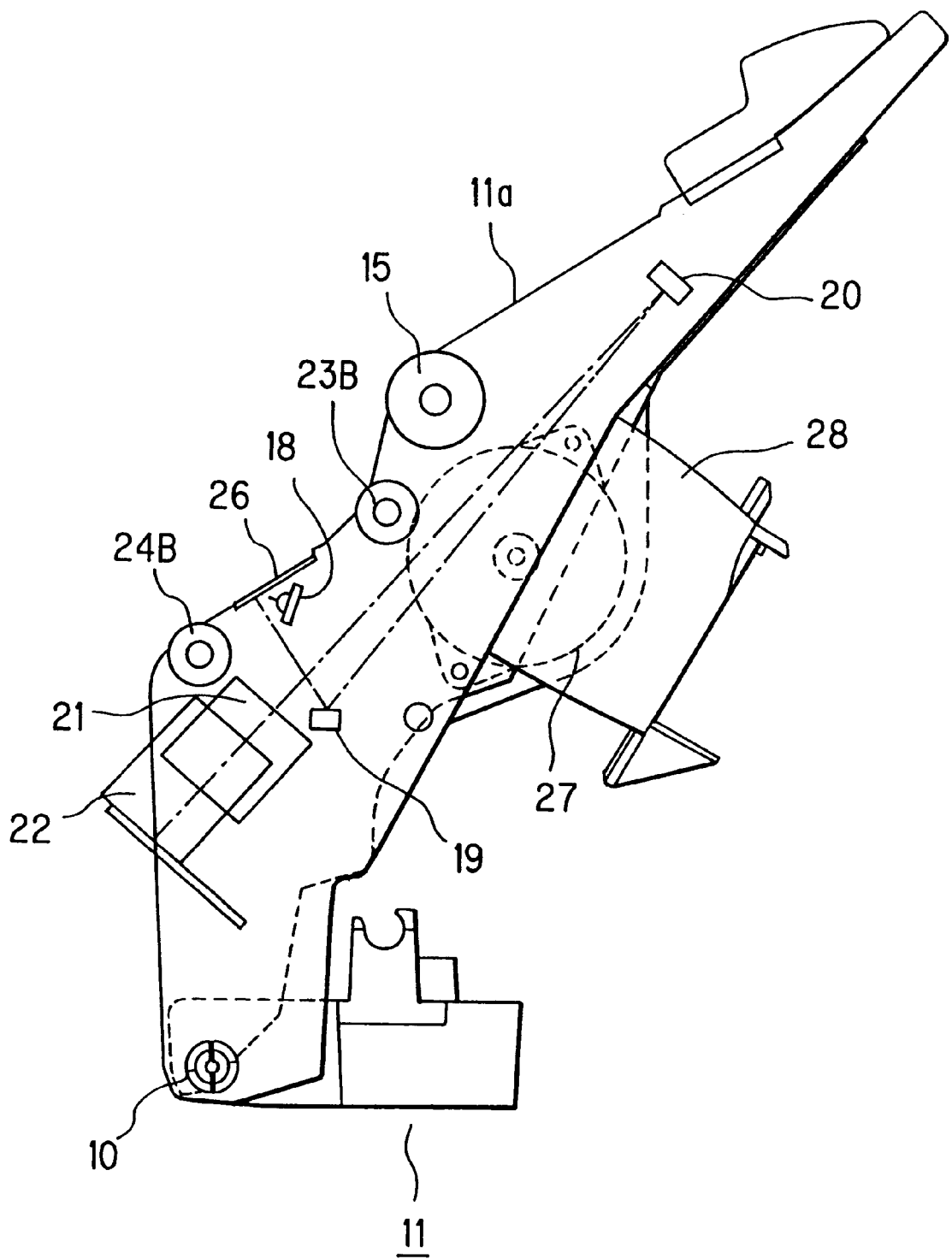
FIG. 5 is a sectional view showing the optical system-incorporating unit shown in FIG. 1.
Figure 6:
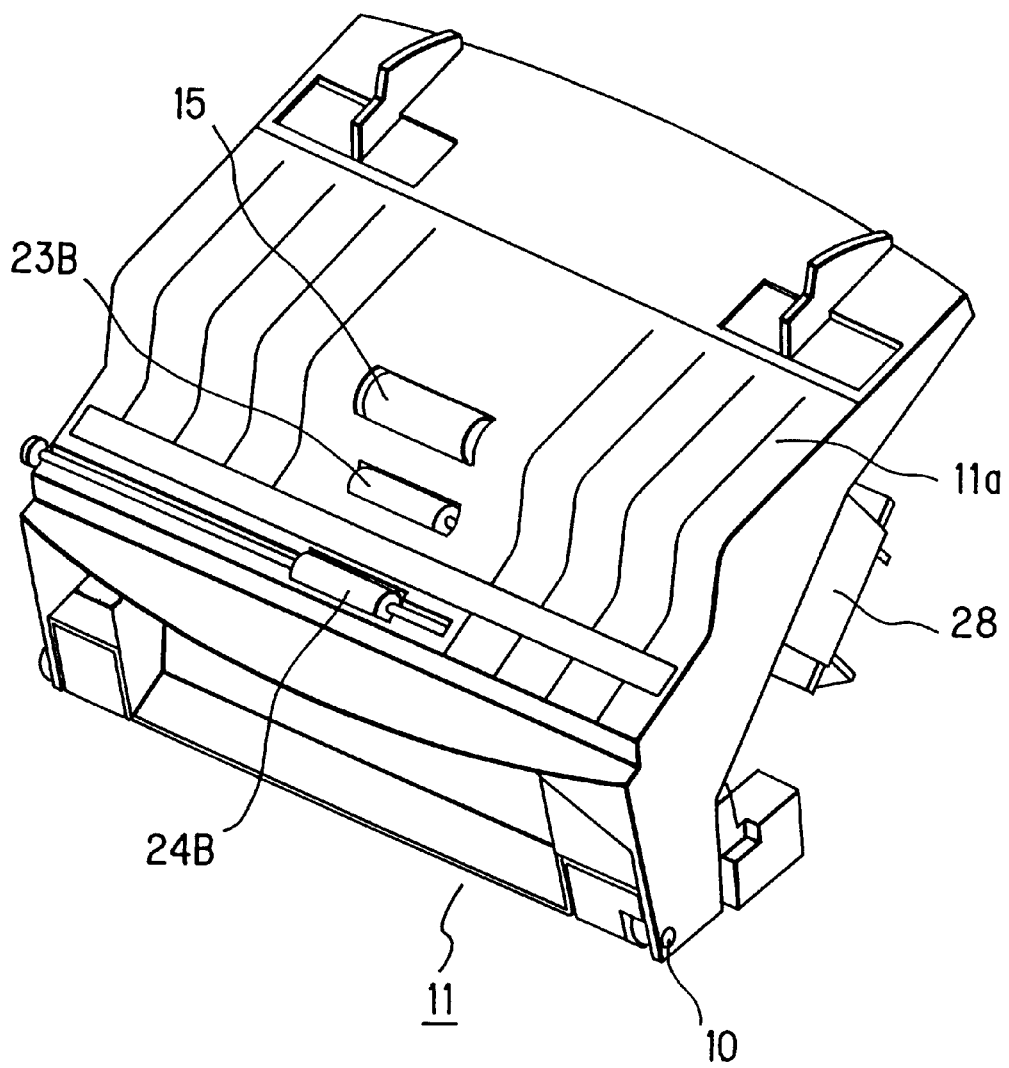
FIG. 6 is a perspective view showing the optical system-incorporating unit shown in FIG. 5, viewed from a point above.
Figure 7:
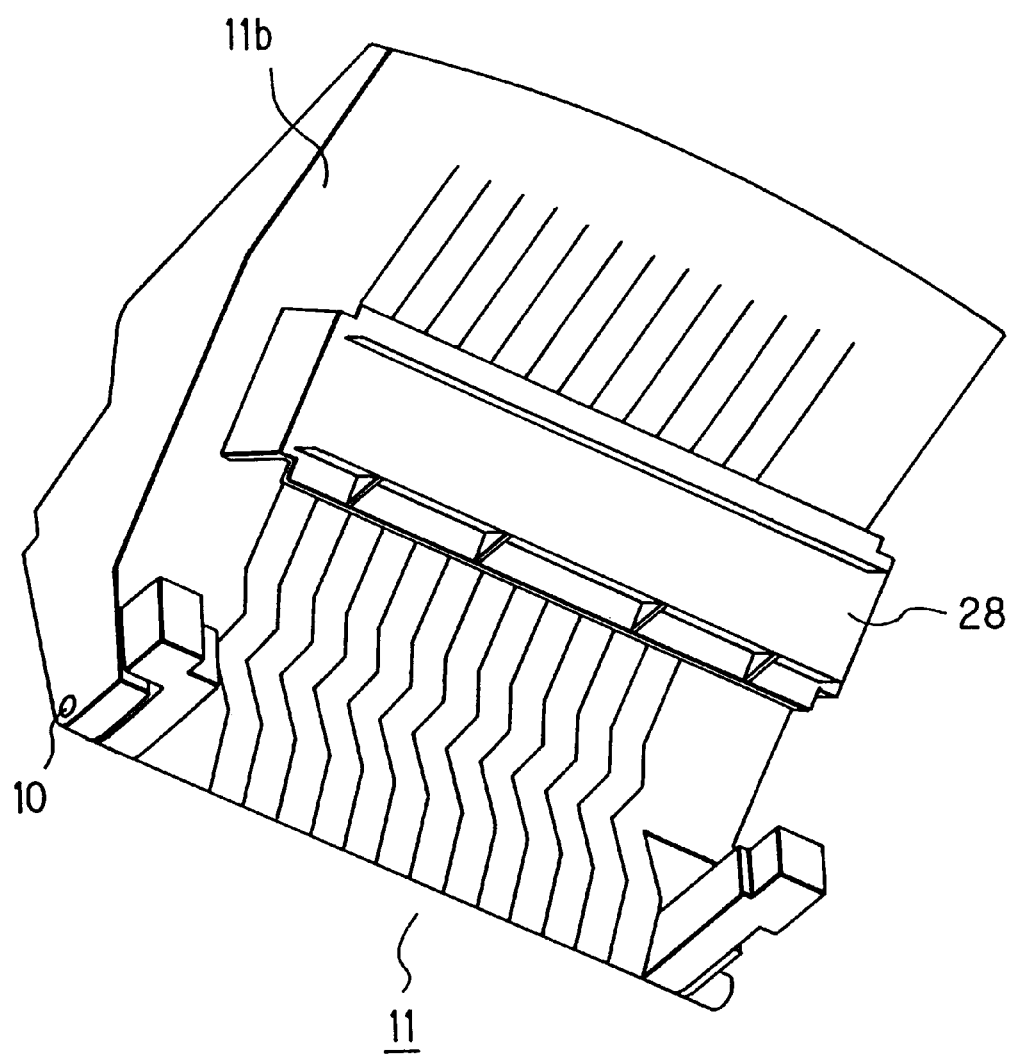
FIG. 7 is a perspective view showing the optical system-incorporating unit shown in FIG. 5, viewed from a point below.

FIG. 5 is a sectional view showing optical system-incorporating unit 11, FIG. 6 is a perspective view showing optical system-incorporating unit 11 viewed from a point above, and FIG. 7 is a perspective view showing optical system-incorporating unit 11 viewed from a point below.

In optical system-incorporating unit 11, as shown in FIG. 5, illuminating lamp 18 of scanner portion 7 and first reflecting mirror 19 reflecting the light reflected by the original are laid out below a cover glass 26 to be the original reading position, and the light from the original is reflected by first reflecting mirror 19 and then further reflected by second mirror 20, so as to be focused on CCD element 22 via focusing lens 21.

Since the original conveyance path for conveying originals is thus configured in this optical system-incorporating unit 11, it is possible to secure the optical path length for the original-reflected light so as to be long enough by deflecting the reflected light from the original twice only using first and second reflecting mirrors 19 and 20. This configuration enables incorporation of scanner portion 7 into optical system-incorporating unit 11, realizing compact design, and prevents attenuation of the intensity of light due to reflection between mirrors 19 and 20 and hence prevents insufficiency of the intensity of light.

Optical system-incorporating unit 11 is provided in a detachable manner with respect to the apparatus body. Therefore, if the surface of illuminating lamp 18 of scanner portion 7 and the first and second reflecting mirrors 19 and 20 are stained, scanner portion 7 can be cleaned readily and reliably. That is, optical system-incorporating unit 11 is detached from the apparatus body, and then recording paper conveyance surface 11b, which is attached to optical system-incorporating unit 11 with screws or the like, is detached therefrom. In this state, the surface of illuminating lamp 18 of scanner portion 7 and the surfaces of first and second reflecting mirrors 19 and 20 can be cleaned. Then, recording paper conveyance surface 11b can attached to optical system-incorporating unit 11 so that optical system-incorporating unit 11 is attached to the original position of the apparatus body. Thus, this configuration for easy and reliable cleaning enables exact reading of an original image.

Further, when the first and second reflecting mirrors 19 and 20 are slightly stained with dust, recording paper conveyance surface 11b may be removed from optical system-incorporating unit 11 with only the optical system-incorporating unit 11 open as shown in FIG. 4, to thereby enable quick and easy cleaning.

Further, optical system-incorporating unit 11 has separation roller 15 for separating originals from one another, feed roller 23B and discharge roller 24B, and further incorporates a stepping motor 27 for driving rollers 23B and 24B. This stepping motor 27 and the aforementioned scanner portion 7 are connected to the apparatus body with an unillustrated connector.

This configuration enables rollers 23B and 24B to be driven with only a few coupling gears, thus making the apparatus compact by the elimination of any unnecessary mechanisms.

Integrally provided in the rear end of optical system-incorporating unit 11 is a guide member 28 which guides the recording paper with an image printed by recording portion 1 toward recording paper conveyance surface lib of optical system-incorporating unit 11 and also covers recording portion 1.

By this configuration, when cabinet cover unit 14 and optical system-incorporating unit 11 are opened together and hence the recording paper conveyance path is freed (exposed) as illustrated in FIG. 4, guide member 28 also moves together with optical system-incorporating unit 11 to thereby directly expose the interior of the apparatus body (recording portion 1). Resultantly, it is possible to readily replace units relating to image formation in recording portion 1 (e.g., the developing unit etc.).

Further, during conveyance of a printed recording sheet from recording portion 1, if the recording sheet is curled at its leading end, the leading end of the recording sheet might be drawn into recording portion 1 when the recording sheet abuts selection lever 3 shown in FIG. 1 and is conveyed to the recording paper conveyance path. In this case, guide member 28 guides the recording sheet toward optical system-incorporating unit 11, thus making it possible to prevent the recording paper from being drawn toward recording portion 1.

Figure 8:
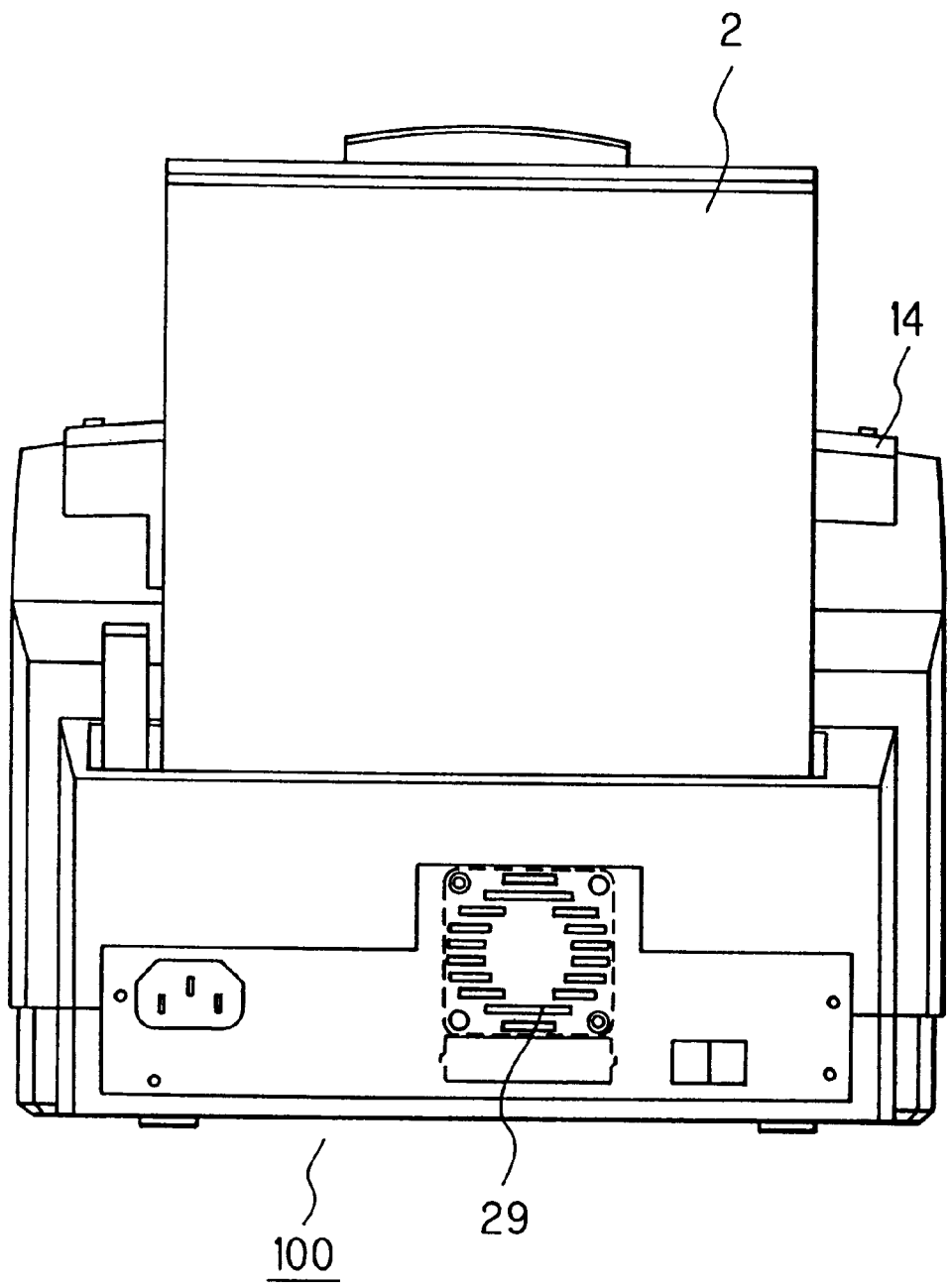
FIG. 8 is a rear-side view showing the image forming apparatus body shown in FIG. 1, viewed from the rear side.
Figure 9:
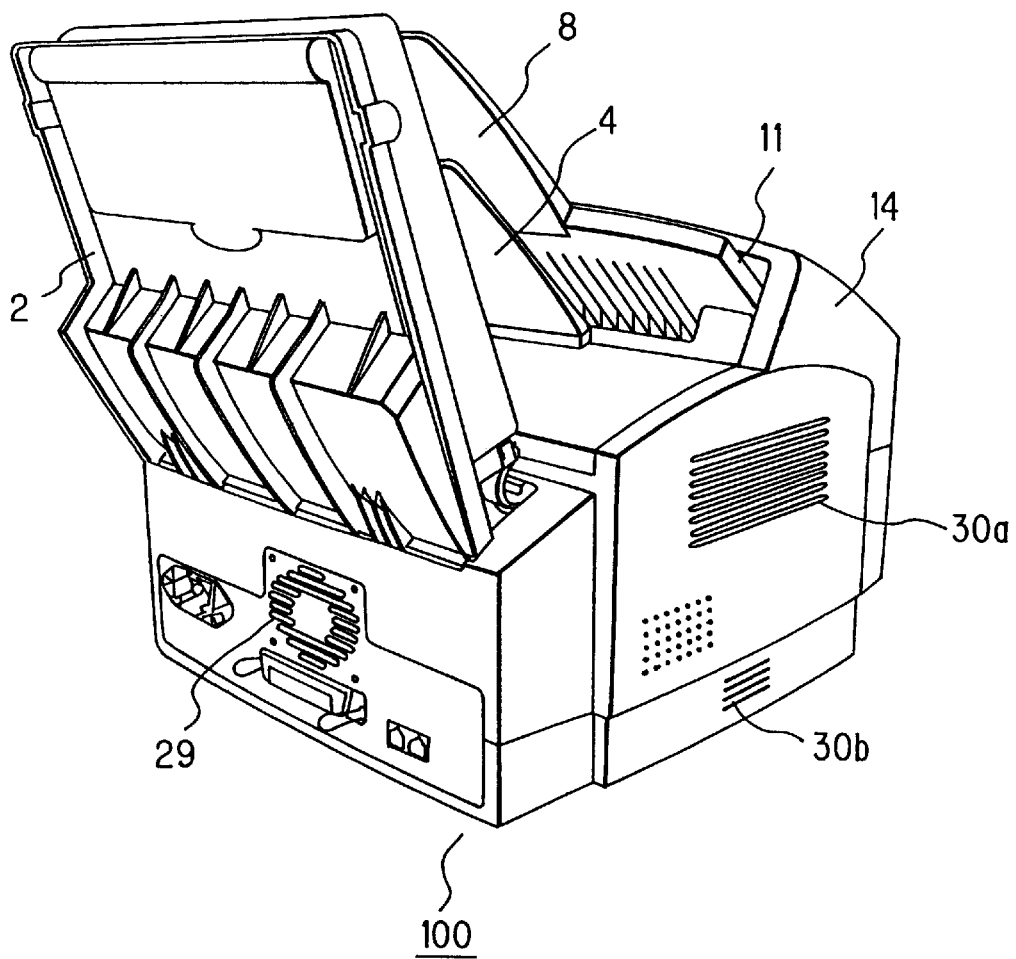
FIG. 9 is a perspective view showing the image forming apparatus body shown in FIG. 1, viewed from a point above on the rear side.

FIG. 8 is a rear-side view showing the apparatus body shown in FIG. 1, viewed from the rear side. FIG. 9 is a perspective view showing the apparatus body, viewed from the rear side. As shown in these figures, an air inlet port 29 for drawing external air into the apparatus body is provided in the center on the rear side of the apparatus body while a pair of air outlet ports 30a and 30b are provided on the sides of the apparatus body.

As shown in FIG. 1, an air suctioning fan 31 is arranged inside air inlet port 29, while a heat roller 32, emitting heat, of recording portion 1 is arranged on the front side of the apparatus body. Further, a control circuit board 33 and a power circuit board 34 are arranged under recording portion 1.

Provided inside the apparatus body at the position opposing air suctioning fan 31 is a slanted member 35 having a predetermined width corresponding to air suctioning fan 32.

By this configuration, air drawn in from the outside by the air suctioning fan goes and abuts slanted member 35 so that the air can be diffused and hence flow uniformly inside the apparatus. The drawn air passes by circuit boards 33 and 34, thereafter is exhausted, with heat from heat roller 32, from air outlet ports 30a and 30b to the machine exterior. (It should be noted that there is a similar air outlet port on the side opposite to that shown in FIG. 9).

In accordance with the image forming apparatus of the above first feature, since the optical system-incorporating unit incorporates an optical system for optically reading the information of originals and this unit is configured so as to be opened and closed with respect to the image forming apparatus body, it is possible to easily clean the optical system, if the elements therein are stained, with only the optical system-incorporating unit open.

Since the original conveyance path as well as the recording paper conveyance path needs a certain minimum length, the reflecting mirrors can be arranged so as to secure the optical length of the optical system in the optical system-incorporating unit by making the best use of this minimum length, for example. Thus it is possible to suppress the attenuation of the intensity of light for reading the original through the optical system to a minimal level, which enables reliable reading of originals.

In accordance with the image forming apparatus of the second feature, the optical system-incorporating unit is configured so as to have an original conveyance surface on the side thereof opposing the cabinet cover portion and a recording paper conveyance surface on the side thereof opposing the interior of the apparatus body, it is possible to design a compact apparatus body.

In accordance with the image forming apparatus of the third feature, a guide member for guiding recording paper toward the optical system-incorporating unit and for covering the recording portion is integrally formed on the side of the recording paper conveyance path surface of the optical system-incorporating unit. Accordingly, when the cabinet cover portion and the optical system-incorporating unit are freed at the same time so as to expose the recording paper conveyance path, the interior of the apparatus body will be exposed, which provides easy replacement of units relating to image formation in the recording portion (e.g., developing unit, etc.).

Further, since the recording paper is guided by the guiding member toward the optical system-incorporating unit, it is possible to prevent the recording paper from being drawn toward the recording portion.

In accordance with the image forming apparatus of the fourth feature, since the optical system-incorporating unit incorporates a driving means for driving the original conveying rollers etc., it is possible to directly drive the original conveying rollers by this driving means, which contributes to attaining a compact design of the apparatus body.

In accordance with the image forming apparatus of the fifth feature, an air suctioning fan for drawing air into the apparatus body is laid out on one side in the interior of the apparatus body and the heat-emitting element is laid out on the opposite side in the interior thereof with circuit boards located therebetween; and a slanted member having a predetermined width is arranged in the position opposing the air suctioning fan in the interior of the apparatus body so that the air drawn in from the outside by the air suctioning fan can be diffused and flow uniformly by the function of the slanted member, whereby the drawn air passes by the circuit boards, thereafter is exhausted together with heat from the heat-emitting element, to the machine exterior. Accordingly, air drawn in from the outside by the air suctioning fan is made to flow uniformly inside the apparatus by the slanted member and the air further passes by the circuit boards, thereafter is exhausted, with heat emitted from the heat roller, for example, as the heat source for fixing the information recording by the recording portion onto the recording paper, to the machine exterior. As a result, the drawn air by the air suctioning fan can be diffused and made to flow uniformly by means of the slanted member, thus achieving reliable cooling of the parts.

In accordance with the sixth feature, since the optical system for optically reading the information of originals is incorporated in the optical system-incorporating unit, it is possible to make the whole image forming apparatus compact when compared to the prior art configuration in which the scanner including the optical system is separately provided above or on the left or right side next to the image forming portion. Further, if the first and second mirrors are stained, they can readily be cleaned by removing the optical system-incorporating unit. Moreover, since the long optical path formed by the first and second mirrors is laid out along the original conveyance path of the optical system-incorporating unit, it is possible to reduce the heat generated from the original reading position as well as to make the apparatus body compact.

In accordance with the seventh and eighth features, the image forming means is disposed on one side of the optical system-incorporating unit while a cabinet cover portion having a control panel portion with a display and control keys and the like, is disposed on the opposite side thereof. Further, the original conveyance path is formed on the side of the optical system-incorporating unit opposing the cabinet cover portion while the recording paper conveyance path for conveying recording paper after recording is formed on the side of the optical system-incorporating unit opposing the image forming means. The recording paper conveyance path is freed by opening the optical system-incorporating unit while the original conveyance path is freed by opening the cabinet cover portion. This configuration enables downsizing of the image forming apparatus body.

In accordance with the ninth feature, since a driving means for driving the original conveying means is incorporated in the optical system-incorporating unit, this configuration only needs electrical connection for driving the original conveying means, without the necessity of providing any coupling means of the driving gears between the image forming means and the original conveying means to drive the original conveying means. Therefore, the whole image forming apparatus body can be successfully down-sized.

What is claimed is:

1. An image forming apparatus at least having an optical system for reading the information of originals and a recording portion for recording the information onto a sheet of recording paper, comprising:

a cabinet cover portion having a control panel portion with a display and control keys, etc.; and an optical system-incorporating unit which incorporates an optical system for optically reading the information of originals and has an original conveying roller for conveying originals to an original reading portion of the optical system, wherein the optical system-incorporating unit can be opened and closed with respect to an apparatus body so that the interior of the apparatus body will be exposed when it is opened while the cabinet cover portion can be opened and closed with respect to the optical system-incorporating unit so that the optical system-incorporating unit will be exposed when it is opened; and an original conveyance path is arranged between the cabinet cover portion and the optical system-incorporating unit for conveying original therethrough to enable the optical system to read the originals; and a recording paper conveyance path is arranged between the optical system-incorporating unit and the apparatus body for conveying recording sheets after printing by the recording portion.

2. The image forming apparatus according to claim 1 wherein the optical system-incorporating unit has an original conveyance surface on the side thereof opposing the cabinet cover portion and a recording paper conveyance surface on the side thereof opposing the interior of the apparatus body, and the recording paper conveyance path is opened by opening the optical system-incorporating unit while the original conveyance path is opened by opening the cabinet cover portion.

3. The image forming apparatus according to claim 2, wherein a guide member for guiding recording paper toward the optical system-incorporating unit and for covering the recording portion is integrally formed on the side of the recording paper conveyance path surface of the optical system-incorporating unit.

4. The image forming apparatus according to claim 1, wherein the optical system-incorporating unit incorporates a driving means for driving the original conveying roller.

5. The image forming apparatus according to claim 1, wherein an air suctioning fan for drawing air into the apparatus body is laid out on one side in the interior of the apparatus body and a heat-emitting element is laid out on the opposite side in the interior thereof with circuit boards located therebetween; and a slanted member having a predetermined width is arranged in the position opposing the air suctioning fan in the interior of the apparatus body so that the air drawn in from the outside by the air suctioning fan can uniformly flow by the function of the slanted member, whereby the drawn air passes by the circuit boards, thereafter is exhausted together with heat from the heat-emitting element, to the machine exterior.

\* \* \* \* \*